United States Patent

[11] 3,626,370

[72] Inventor Robert J. Stubbs
Minnetonka, Minn.
[21] Appl. No. 866,460
[22] Filed Oct. 15, 1969
[45] Patented Dec. 7, 1971
[73] Assignee Honeywell Inc.
Minneapolis, Minn.

[54] AIR-CONDITIONING CONTROL SYSTEM HAVING DISPLAY MEANS TO SHOW APPARATUS BEING SUPERVISED AND/OR CONTROLLED
2 Claims, 2 Drawing Figs.

[52] U.S. Cl. .......... 340/163, 340/213 Q, 236/1
[51] Int. Cl. .......... H04q 9/00
[50] Field of Search .......... 340/150, 163, 213 Q, 172.5, 409; 236/1

[56] References Cited

UNITED STATES PATENTS

| | | | |
|---|---|---|---|
| 2,967,232 | 1/1961 | Ferm et al. | 340/163 UX |
| 3,058,663 | 10/1962 | Barnard | 340/150 X |
| 3,324,458 | 6/1967 | MacArthur | 340/154 UX |
| 3,387,084 | 6/1968 | Hine et al. | 178/6.8 |
| 3,529,292 | 9/1970 | Neill et al. | 340/163 |
| 3,548,378 | 12/1970 | Blizard et al. | 340/150 |

*Primary Examiner*—Donald J. Yusko
*Attorneys*—Lamont B. Koontz, Francis A. Sirr and Clyde C. Blinn

ABSTRACT: A system for remote temperature supervision and temperature control of a large and multispace, complex air-conditioning system wherein a central console is connected over a transmission circuit to a plurality of groups of remote apparatus. The console has a cathode ray tube for displaying a pictorial showing of a schematic layout of any one of the plurality of groups of apparatus. The cathode ray tube is selectively energized to obtain from a continuously updated memory one of a number of pictorial showings upon an operator at the central console associating the console and supervision apparatus of the console with one particular group of apparatus. The pictorial showing can be referred to for the identification of the particular apparatus to be supervised and/or controlled.

Figures 1, 2:
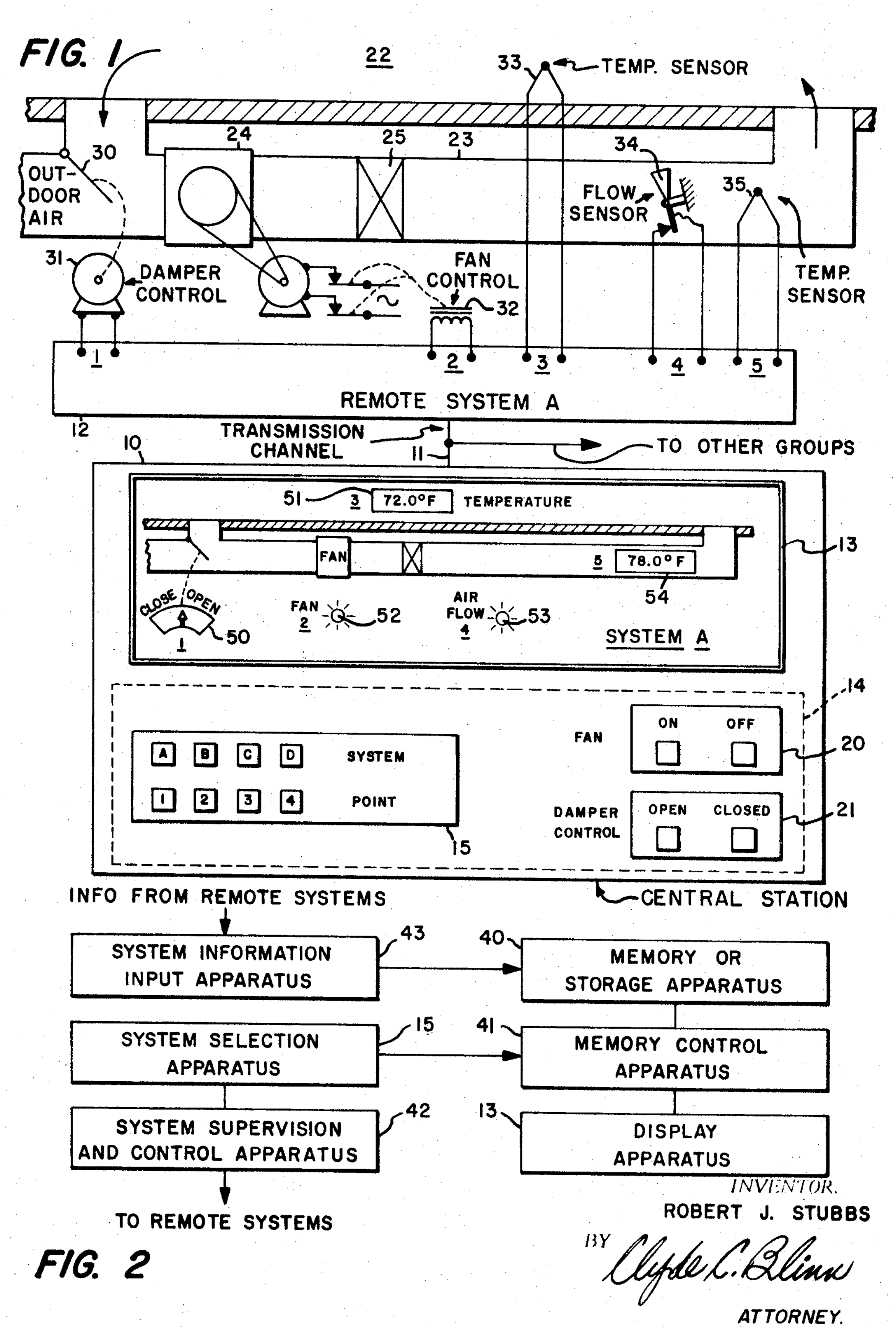

INVENTOR.
ROBERT J. STUBBS
BY Clyde C. Blinn
ATTORNEY.

AIR-CONDITIONING CONTROL SYSTEM HAVING DISPLAY MEANS TO SHOW APPARATUS BEING SUPERVISED AND/OR CONTROLLED

BACKGROUND AND SUMMARY OF THE INVENTION

The supervision and control of an air-conditioning system from a central console, which has a pictorial showing of the apparatus at remote locations, using a slide projector and a screen, to assist the operator in identifying the particular apparatus to be supervised and controlled is broadly disclosed in the William B. Barnard, U.S. Pat. No. 3,058,663.

In the present invention, a display or cathode-ray tube on the central console has an electrical storage or memory so that upon the supervision and control apparatus of the central console being associated with a particular remote station, a schematic showing of apparatus of the remote station can be selected from the memory and visually displayed. The memory is constantly updated by information received from the remote apparatus of every station so that upon a particular showing being selected from the memory, the present condition of the remote apparatus is displayed at the console.

The invention is shown in a drawing in which:

FIG. 1 is a schematic representation of a system having a central station and a plurality of groups of remote apparatus of which only one is shown, and FIG. 2 is a block diagram of the system for selecting the showing for the display from the storage and for maintaining the storage updated.

DESCRIPTION OF THE INVENTION

Referring to FIG. 1, a central station or console 10 is connected over a transmission channel or circuit 11 to a plurality of remote stations or groups of apparatus of which only one group, remote system A, is shown as having a panel 12. With apparatus associated with console 10, air-conditioning supervision and control apparatus associated with the various remote systems containing condition responsive and/or control apparatus, such as system A, can be selectively supervised and/or maintained, and controlled. While the type of transmission over transmission channel 11 is no part of the present invention, one particular transmission system is disclosed in the James R. Berrett et al. application, Ser. No. 864,679, wherein a serial binary code is sent to and from the central console and remote system panels.

Console or panel 13 has a display apparatus or screen 13 on which a pictorial showing or schematic of the apparatus associated with any one of the remote systems is selectively displayed. Specifically, display apparatus 13 is a cathode-ray tube (CRT) electrically connected to a memory or electrical storage apparatus shown in FIG. 2. Upon operation of an electrical circuit, a pictorial showing can be selected from the memory to be displayed on the cathode-ray tube. The specific display apparatus and memory is commercially available and is described in one form as a computer-generated TV display for use by NASA in *Electronic Design* 17, Aug. 16, 1969, pages 44 to 47.

A control and supervision panel 14 in the central console comprises a conventional manual selection system 15 wherein a plurality of pushbuttons are provided for selecting the particular remote systems (A to D) and particular stations or points (1 to 5) of the system. While panel 14 may contain other types of supervision and control apparatus, for explanation purposes, a fan control apparatus 20 provides for switches to turn the fan on and off and a damper control apparatus 21 provides for the control of the damper in an open or closed direction.

REferring to the remote system A associated with zone or space 22, panel 12 has a plurality of input and output circuits for stations or points 1 to 5. An air-conditioning system provides for air to pass through a duct 23 under the power of a fan 24 to be conditioned by a heat exchanger 25 and to be delivered into space 22. A damper 30 controls the mixture of return air and outdoor air. A damper motor 31 is controlled from point 1 of panel 12. A fan controller or relay 32 controls the operation of the fan motor from point 2. A temperature sensor or thermocouple which senses the temperature in zone 22 is connected to point 3. A flow sensor or sail switch 34 responds to the flow of air through duct 23 and is connected to point 4. Another temperature-responsive element or thermocouple 35 responds to the temperature of the air being delivered from duct 23 to zone 22 and is connected to point 5.

Referring to FIG. 2, the certain apparatus of central station or console 10 is shown in block diagram form. Display apparatus 13 is connected to a magnetic or metal oxide semiconductor (MOS) type memory apparatus 40 by a memory control apparatus 41. Upon the memory control receiving a selection signal from the system selection apparatus 15, a particular stored schematic showing is displayed on cathode-ray tube 13. Since the operation of the display apparatus is brought about by the system selection buttons A to D as shown in FIG. 1, a showing of the system is provided before a point or station selection is made by the buttons 1 to 4. The connection of the system supervision and control apparatus 14 of console, particularly, fan control 20 and damper control 21 to the remote apparatus of the system selected is accomplished by the point selection buttons.

The system information input apparatus or information retrieval system 43 continually receives information from the remote systems connected to the central station in a conventional manner, whereby the present status or condition of the apparatus associated with each of the remote systems can be stored in memory 40. When a particular pictorial showing is taken from memory for display, the information displayed is up-to-date. For example, referring to the display of system A on the console in FIG. 1, a meter 50 provides an indication of the position of damper 30 connected to remote station 1, an indicator 52 is provided for the condition of fan 24 connected to station 2, a digital readout device 51 is provided for the present station 2, a digital readout device 51 is provided for the present temperature of sensor 33 connected to station 3, an indicator 53 shows the condition of flow sensor connected to station 4, and another digital readout device 54 is provided for the present temperature of sensor 35 connected to station 5.

OPERATION OF THE INVENTION

From the central station or console 10 shown in FIG. 1, the human operator can control and supervise an air-conditioning system connected to the plurality of remote system panels over the transmission channel 11. In order to control or supervise the apparatus of a particular system, the operator manually pushes a system selection button, such as A, on panel 15. When button A is pushed, the apparatus of the central station is associated with the remote station A; however, before any particular supervision and control is accomplished, memory control 41 of FIG. 2 is energized to obtain a showing of the system A to be displayed on screen 13.

Upon referring to the showing of system A, as shown in FIG. 1, the human operator can observe the various condition or status of the apparatus associated with system A. Since the memory has been continually updated, the information shown would be the present information, such as the temperature at station 3 and the position of the fresh air damper at station 1. In order to control any particular apparatus associated with system A, the control apparatus of console 10 is connected to a particular station of system A by manually pushing the station button.

For example, the fan is shown as being energized by indicator 52. The operator could push button 2 and then the fan off button con control 20 to send a coded message to the remote system A to deenergize fan relay 32 and thus turn off the fan. As the status of the various systems is continually scanned and memory 40 is continually updated by the system information input 43, the memory control would reflect a change in the condition of fan 24 and indicator 52 for the fan status would appear to go out to show the fan has been deenergized.

The embodiments of the invention in which an exclusive property or right is claimed are defined as follows:

1. In a system for remote supervision and control of a plurality of air-conditioning apparatuses, a central station comprising:

a console of supervision and control apparatus whereby a human operator can supervise various operating conditions of a remote air-conditioning apparatus and control selected apparatus associated with a remote air-conditioning apparatus, and electric signal generated display means comprising electrical storage means for displaying a selected showing of a remote air-conditioning apparatus, a plurality of remote groups of stations having air-conditioning apparatus to be supervised and controlled by the human operator at said central station, transmission means connecting each of said groups of remote stations to said central station, means associated with the air-conditioning apparatus of each of said groups of remote stations for obtaining present air-conditioning operating condition information of said air-conditioning apparatus of selected stations and storing said present information in said electrical storage means, said electrical storage means having stored therein pictorial showings of said air-conditioning apparatus of each of said remote groups of stations with said present air-conditioning operating condition information, and further means associated with said console in said central station whereby the human operator can select one air-conditioning apparatus of one of said groups of remote stations to be associated with said supervision and control apparatus of said console and simultaneously select from said electrical storage means electric signals for generating a pictorial showing of said one air-conditioning apparatus of said one group of stations with said present air-conditioning operating information of said one air-conditioning apparatus displayed on said pictorial showing, said pictorial showing being used by the human operator for aiding in the supervision and control of said one air-conditioning apparatus.

2. The invention of claim 1 wherein said display means comprises a cathode-ray tube and said storage means comprises a memory for providing electrical outputs to selectively energize said cathode-ray tube for generating a pictorial showing of one remote group of air-conditioning apparatus with said present air-conditioning operating condition information of said apparatus of said one remote group.

* * * * *